United States Patent Office 3,626,770
Patented Dec. 14, 1971

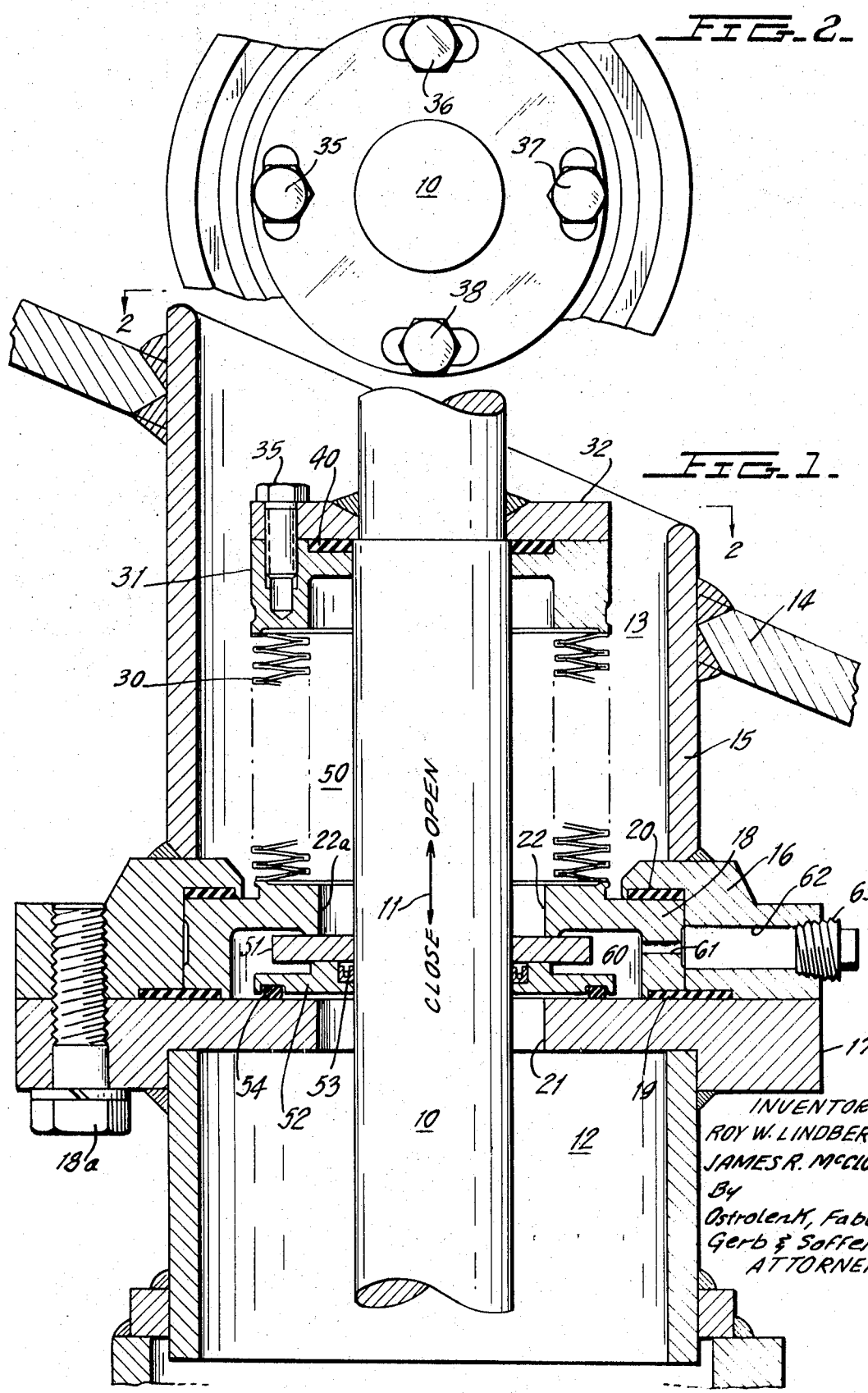

3,626,770
BACK-UP SEAL FOR BELLOWS
Roy W. Lindberg, Sierra Madre, and James R. McCloud, Burbank, Calif., assignors to I-T-E Imperial Corporation, Philadelphia, Pa.
Filed Jan. 30, 1970, Ser. No. 6,997
Int. Cl. F16j 15/52
U.S. Cl. 74—18.2                              6 Claims

ABSTRACT OF THE DISCLOSURE

A bellows is attached to a movable shaft which extends through a barrier between a high-pressure and low-pressure region. The bellows forms a seal between the outer diameter of the shaft and the opening in the barrier through which the shaft passes. A sealing ring formed around the shaft then forms a second seal between the bellows interior and the shaft. A monitoring channel is connected to the volume bounded between the back-up seal and the bellows interior.

BACKGROUND OF INVENTION

This invention relates to structures for passing a longitudinally-movable shaft through a barrier between a high-pressure and low-pressure region while maintaining separation of these regions, and more particularly relates to a novel back-up seal for a bellows used to seal a movable shaft to a barrier between high and low-pressure regions.

Transmission of forces through a movable rod extending between high and low-pressure regions is a common requirement and is used, for example, for the operation of high-voltage circuit interrupters which are contained within high-pressure gas filled tanks and are operated from mechanical means produced by operating mechanisms which are located externnally of the tank. By way of example, sulfur hexafluoride filled circuit interrupter tanks containing sulfur hexafluoride at pressures of 4 to 5 atmospheres are commonly operated from operating shafts extending into the tanks from the low-pressure ambient.

It is necessary in this type aplication to insure the best possible seal between the operating shaft and the barrier through which it passes to enter the high-pressure chamber since leakage at this region can result in the unintentional loss of gas (which is expensive) within the high-pressure tank and the possible failure of the circuit interrupter.

A common prior practice, for sealing such shafts, has been to use a bellows having one portion connected around the opening in the barrier through which the shaft passes. The bellows will then permit motion of the shaft, limited only by the flexibility of the bellows. Arrangements of this type are shown in copending application Ser. No. 680,778, filed Nov. 6, 1967, in the name of John H. Golota, entitled Adjustable Contact Nozzle and Retractable Arcing Chamber for Gas Blast Circuit Breakers, and assigned to the assignee of the present invention (FIG. 29 thereof).

One difficulty with such bellows as the sole means for forming the seal between the high and low-pressure regions is the possibility of bellows failure which could permit the loss of the expensive SF$_6$ gas from the high-pressure tank and could possibly prevent the breaker from operating properly if it were called upon to interrupt during low-pressure conditions.

SUMMARY OF INVENTION

In accordance with the present invention, a novel back-up seal ring is provided in combination with the bellows which, independently of the bellows, can provide a seal about the barrier through which the movable shaft passes. Moreover, an intermediate sealed volume is now defined between the conventional bellows and the novel back-up seal, where this intermediate volume can be monitored to detect the presence of the high-pressure gas within the main sealed volume which would indicate a bellows leakage or failure.

Accordingly, the primary object of this invention is to provide a novel back-up seal means for a sealing bellows in which the seal means and bellows define an intermediate chamber between a high and low pressure region.

Another object of this invention is to provide an intermediate pressure chamber in a seal between a high and low-pressure region, wherein the intermediate pressure chamber can be monitored for the presence of material from the high-pressure chamber to determine a leak or failure of one of the seal components.

BRIEF DESCRIPTION OF DRAWINGS

FIG. 1 is a cross-sectional view of a movable shaft which passes through a barrier separating a high-pressure and low-pressure region, and is provided with a seal structure in accordance with the invention.

FIG. 2 is a top elevational view of FIG. 1 as seen from the line 2—2 at the top of FIG. 1.

DETAILED DESCRIPTION OF INVENTION

Referring now to the figures, there is illustrated an operating shaft 10 which may be of any desired material, such as steel and which is movable in a longitudinal direction, as indicated by arrow 11. Shaft 10 may also have lateral movement which can be accommodated in a manner to be later described. Where the shaft 10 is the operating shaft for a high-pressure gas or air circuit breaker, movement of the shaft 10 in an upward direction in FIG. 1 is assumed to cause opening of a circuit breaker, and movement of the shaft 10 downwardly is assumed ot cause the closing of the circuit breaker. These directions could be reversed.

The shaft 10 extends from low-pressure region 12 and into high-pressure region 13. The high-pressure region 13 could, for example, be the interior of the high-pressure tank of application Ser. No. 680,778, noted above, where a portion of the tank wall is shown in FIG. 1 as tank wall 14, the interior of which is filled with high-pressure sulfur hexafluoride. Tank wall 10 is welded to a sleeve 15 and the sleeve 15 is, in turn, welded to a flange plate 16. Flange plate 16 is then bolted to flange plate 17 by a plurality of bolts, one of which is shown in FIG. 1 as bolt 18a. Flange plates 16 and 17 capture between them an intermediate plate member 18. Leakage between plates 16, 17 and 18 is prevented by gaskets 19 and 20. Plates 17 and 18 are provided with central openings 21 and 22, respectively, through which the shaft 10 passes. Thus, plates 17 and 18 (and 16) can be considered to be the barrier between the high-pressure and low-pressure regions 13 and 12, respectively, through which shaft 10 passes.

One conventional method for forming a seal between shaft 10 and the openings 21 and 22 is the use of a bellows 30. The bellows 30 is secured to the shaft 10 in any desired manner wherein the lower end of the bellows 30 is securely fastened as by welding, or the like, to intermediate plate member 18, while the upper end of bellows 30 is similarly securely fastened to bellows plate 31 in an air-tight manner. The bellows plate 31 is connected to a plate 32 which is welded to shaft 10 by a plurality of bolts, such as the bolts 35 to 38. A gasket 40 is provided between plates 31 and 32 to insure a good pressure seal between plates 31 and 32.

From the above structure, it will be clear that the bellows 30 defines a seal between shaft 10 and openings 21 and 22, with the bellows permitting the longitudinal motion of shaft 10. In addition, if the nature of the operating mechanism is such that shaft 10 will also have some lateral motion, this lateral motion can be absorbed in the flexing of the bellows 30. If the bellows 30 fails, and it is the sole sealing member, there will be leakage of the high-pressure gas from the high-pressure region 13 to the low-pressure region 12. In accordance with the present invention, however, a back-up seal is provided, which forms an intermediate chamber between low-pressure region 12 and high-pressure region 13, this chamber including the interior 50 of the bellows 30.

The back-up seal of the invention includes plate 51 which may be made of stainless steel and which has an interior opening which slidably receives shaft 10. Shaft 10 preferably has a polished outer surface so that it can slide easily with respect to plate 51. Similarly, the outer surface of plate 51 should be well polished so that it can slide easily over the downwardly-projecting neck 22a of plate 22.

A seal plate 52 is then provided which is sealed to the exterior diameter of shaft 10 by a U-shaped cross-section seal ring 53, while the lower surface of plate 52 is sealed to the upper surface of flange plate 17 by a seal ring 54. The surfaces associated with seals 53 and 54 may be appropriately lubricated with a suitable moving-seal lubrication.

The chamber 50 in the interior of bellows 30 is in communication with the chamber 60 through the non-sealed connection between the upper surface of plate 51 and portion 22a of plate 22. A small opening 61 is then formed through the wall of plate 18 and communicates with a test probe opening 62 which can receive a suitable gas-sensing probe, when desired, to test for the existence of sulfur hexafluoride (or other high-pressure gases being sealed in chamber 13) which may have leaked past bellows 30. Channel 62 may be plugged by a suitable plug 63 when not in use. Clearly, however, monitored equipment can be permanently connected to channel 62.

The purpose of seal 54 is to permit lateral movement of the shaft 10 while still maintaining a seal between the bottom of plate 52 and the top of flange plate 17. The purpose of seal 53 is to form a seal to the external diameter of shaft 10 while permitting the shaft 10 to have longitudinal motion with respect to plate 52. Thus, the two seals 53 and 54 define a secondary or back-up seal arrangement for the bellows 30. Thus, if the bellows 30 should fail, the high-pressure gas in region 13 would still be prevented from flowing to the low-pressure region 12 by the back-up seal arrangement. Moreover, the failure or leakage of the bellows 30 can now be easily detected in channel 62.

The seal 53, having a U-shaped cross-section, has the characteristic of sealing in only one direction. That is to say, seals of this type will prevent the passage of a gas or fluid from the high-pressure to the low-pressure region, but would not prevent the reverse flow of a fluid. For this reason, during the closing stroke or downward movement of shaft 10, and while the bellows 30 is expanding, air can flow into volume 50 from low-pressure region 12, thereby reducing the pressure differential on the bellows 30 from what it would have been if air could not have moved into volume 50 from the low-pressure region 12. During the opening stroke, this captured air is further compressed, thereby further reducing pressure differential on the bellows 30. Obviously, if this captured air should leak slowly past seals 53 and 54, no damage would occur.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A multiple seal structure for a longitudinally movable shaft passing through one aperture in a wall between relatively high and relatively low-pressure regions; said relatively high and relatively low-pressure regions being filled with first and second gases at respectively relatively high and low pressures; said multiple seal structure comprising:

a first seal means extending from the external periphery of said shaft at a first longitudinal location thereon to a first region of said wall surrounding said aperture in said wall, thereby to form a first seal between said high and low-pressure regions; and a second seal means extending from the external periphery of said shaft at a second longitudinal location thereon, which is longitudinally spaced from said first longitudinal location, to a second region of said wall surrounding said aperture in said wall, thereby to form a second seal between said high and low-pressure regions, and thereby further providing an intermediate volume between said first and second seal means;

said second seal means including a sealing ring having one-way sealing characteristics whereby gas can flow into said intermediate volume from said low-pressure region when said intermediate volume is enlarged by the movement of said movable shaft, and whereby flow of gas from said intermediate volume to said low-pressure region is prevented when said intermediate volume is decreased by the movement of said movable shaft.

2. The structure of claim 1 which further includes sensor channel means extending into said intermediate volume for receiving sensors to determine leakage from said high-pressure region into said intermediate volume.

3. The structure of claim 1 wherein said first seal means comprises a bellows.

4. The structure of claim 2 wherein said first seal means comprises a bellows.

5. The structure of claim 1 which further includes a plate means slidably received by said shaft and extending perpendicularly to the axis of said shaft, and wherein said second seal means includes an annular gasket; said annular gasket being disposed between said wall and said plate; one surface of said annular gasket engaging the surface of said wall and surrounding said aperture; the opposite surface of said gasket being sealed relative to said plate, whereby said shaft can laterally move within said aperture while said annular gasket maintains a seal between said intermediate volume and said low-pressure region.

6. The structure of claim 4 which further includes a plate means slidably received by said shaft and extending perpendicularly to the axis of said shaft, and wherein said second seal means includes an annular gasket; said annular gasket being disposed between said wall and said plate; one surface of said annular gasket engaging the surface of said wall and surrounding said aperture; the opposite surface of said gasket being sealed relative to said plate, whereby said shaft can laterally move within said aperture while said annular gasket maintains a seal between said intermediate volume and said low-pressure region.

References Cited

UNITED STATES PATENTS

| | | | |
|---|---|---|---|
| 2,754,805 | 7/1956 | Beman | 74—18.2 X |
| 2,944,639 | 7/1960 | Blake | 74—18 X |
| 3,106,099 | 10/1963 | Jeffrey et al. | 74—18.2 |
| 3,175,472 | 3/1965 | Little | 74—18.2 X |
| 3,488,763 | 1/1970 | Lofquist, Jr. | 74—18.2 X |
| 3,497,038 | 2/1970 | Schrader et al. | 74—18.2 X |

WILLIAM F. O'DEA, Primary Examiner

F. D. SHOEMAKER, Assistant Examiner

U.S. Cl. X.R.

277—59, 174